(12) United States Patent
Morawitz et al.

(10) Patent No.: US 10,740,894 B2
(45) Date of Patent: Aug. 11, 2020

(54) TRACKED VEHICLE

(71) Applicant: CLAAS Industrietechnik GmbH, Paderborn (DE)

(72) Inventors: Martin Morawitz, Salzkotten (DE); Peter Meyer, Grosshansdorf (DE); Jan-Willem Verhorst, Lippstadt (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 0 days.

(21) Appl. No.: 16/181,650

(22) Filed: Nov. 6, 2018

(65) Prior Publication Data

US 2019/0139211 A1   May 9, 2019

(30) Foreign Application Priority Data

Nov. 8, 2017   (DE) .................. 10 2017 126 134

(51) Int. Cl.
| | |
|---|---|
| *G06T 7/00* | (2017.01) |
| *B62D 55/02* | (2006.01) |
| *B60C 11/24* | (2006.01) |
| *G06T 7/62* | (2017.01) |
| *B62D 55/26* | (2006.01) |

(Continued)

(52) U.S. Cl.
CPC ............ *G06T 7/001* (2013.01); *B60C 11/246* (2013.01); *B62D 55/02* (2013.01); *B62D 55/26* (2013.01); *G01B 11/22* (2013.01); *G06K 9/00671* (2013.01); *G06T 7/62* (2017.01); *G01M 17/03* (2013.01); *G06T 2207/30164* (2013.01); *G06T 2207/30252* (2013.01)

(58) Field of Classification Search
CPC . G06T 7/001; G06T 7/62; G06T 2207/30164; G06T 2207/30252; B60C 11/246; B62D 55/02; B62D 55/26; G06K 9/00671; G01M 17/03
See application file for complete search history.

(56) References Cited

U.S. PATENT DOCUMENTS

| | | |
|---|---|---|
| 6,044,313 A | 3/2000 | Gannon |
| 8,065,061 B2 | 11/2011 | O'Neal |

(Continued)

FOREIGN PATENT DOCUMENTS

| | | |
|---|---|---|
| DE | 112008003244 T5 | 10/2010 |
| WO | 2017000068 A1 | 1/2017 |
| WO | 2017049383 A1 | 3/2017 |

OTHER PUBLICATIONS

European Search Report dated .Feb. 27, 2019 in European Application No. EP 18 20 1677 with English translation of the relevant parts.

(Continued)

*Primary Examiner* — Michael E Teitelbaum
(74) *Attorney, Agent, or Firm* — Collard & Roe, P.C.

(57) ABSTRACT

A tracked vehicle, in particular an agricultural tracked vehicle, has a crawler track assembly including at least one track-laying unit. The track-laying unit has at least two ground drive wheels and a track belt guided over the ground drive wheels. An evaluation device is provided, which is configured for carrying out a determination of the state of wear of at least one track belt of the crawler track assembly with the aid of an image-based comparison of at least two components of the tracked vehicle, at least one of which is a component of the track belt.

13 Claims, 4 Drawing Sheets

(51) Int. Cl.
  *G01B 11/22*   (2006.01)
  *G06K 9/00*    (2006.01)
  *G01M 17/03*   (2006.01)

(56) References Cited

U.S. PATENT DOCUMENTS

| | | | |
|---|---|---|---|
| 9,067,631 B1 * | 6/2015 | Lussier | B62D 55/125 |
| 9,592,866 B2 * | 3/2017 | Hasselbusch | B62D 55/20 |
| 2012/0306916 A1 * | 12/2012 | Marumoto | G01B 11/24 |
| | | | 345/632 |
| 2014/0105481 A1 * | 4/2014 | Hasselbusch | G06T 7/0006 |
| | | | 382/141 |

OTHER PUBLICATIONS

European Search Report dated May 8, 2019 in European Application No. EP 18 20 1698 with English translation of the relevant parts.

* cited by examiner

TRACKED VEHICLE

CROSS-REFERENCE TO RELATED APPLICATIONS

This application claims priority under 35 USC 119 of German Application No. 102017126134.6, filed on Nov. 8, 2017, the disclosure of which is herein incorporated by reference.

BACKGROUND OF THE INVENTION

The invention relates to a tracked vehicle, in particular, an agricultural tracked vehicle, and to a method for determining the state of wear and/or the service life of at least one track belt of a tracked vehicle.

A tracked vehicle within the scope of the invention is understood to be any form of vehicle comprising a crawler track assembly and, if necessary, an additional wheeled travel mechanism. A tracked vehicle comprises, in particular, a separate ground drive for generating a propulsion, although it can also be a non-driven vehicle, for example, a trailer. Although there is a plurality of different applications which are encompassed by the present invention, the focus in the following is on tracked vehicles for carrying out agricultural work, which are referred to here as agricultural tracked vehicles. Tractors and self-propelled harvesting machines, such as combine harvesters or forage harvesters, are mentioned merely by way of example.

Vehicles of this type can be designed as a tracked vehicle or a half-track vehicle. Half-track vehicles comprise a crawler track assembly including at least one track-laying unit, in particular including two track-laying units positioned opposite one another relative to the vehicle longitudinal axis (direction of travel). The track-laying units each comprise, in turn, several rollers which are connected to one another via a revolving track belt in the form of a moving belt or a track chain. For example, track-laying units are known, which comprise a drive roller driven by the ground drive, a guide roller, and land rollers situated therebetween. In another variant, the so-called triangular traction unit, the track-laying unit comprises two guide rollers and a drive wheel situated above these, in the center. The focus here is to be on the variant of a vehicle comprising a rubber track.

Crawler track assemblies are often utilized on agricultural vehicles which have a high axle load. In this case, the wear of the outer lugs of the track belts, which are also referred to as track pads in the case of track chains, is one of the decisive criteria for the end customer, since the service life is mostly shorter than is the case with wheeled travel mechanisms, and the parts costs are comparatively high. The user generally assumes that the wear is linear and generally replaces the track belt before the start of the usage campaign, in order to avoid downtimes during the campaign. The wear is often not linear, however, due, inter alia, to the upwardly tapering shape of the outer lugs, but rather, for example, is degressive, i.e., the wear decreases as the duration of use increases. It is definitely possible, therefore, that the user will replace a track belt before an upcoming campaign, even though the track belt could have been utilized during the entire campaign.

Since it is difficult for the user to determine the optimal point in time to replace the track belts, it is known from the related art, on which the present invention is based, to determine the remaining service life with the aid of specific wear diagrams from the belt manufacturer. For this purpose, the user must manually measure the height of the outer lugs and then enter the value over the number of operating hours in a nomogram. On the basis of the comparison of several measured values, the user can then predict the remaining service life. This method is complex and susceptible to error, however.

It is also known from the related art to provide temperature sensors in tires of a vehicle, which wirelessly transmit a temperature signal which can be used as a piece of driver information in order to avoid a critical state of wear. An integration of appropriate sensors into a track belt is complex and costly, however. In addition, such sensors are subject to considerable loads during operation and, therefore, can also fail or yield incorrect measured values.

SUMMARY OF THE INVENTION

The problem addressed by the invention is that of designing and refining the known tracked vehicle in such a way that a determination of the state of wear and/or the service life of the track belts is optimized.

The aforementioned problem is solved according to the invention by an agricultural tracked vehicle comprising a crawler track assembly including at least one track-laying unit, wherein the particular track-laying unit comprises at least two ground drive wheels and a track belt guided over the ground drive wheels. An evaluation device is provided, which is configured for carrying out a determination of the state of wear of at least one track belt of the crawler track assembly with the aid of an image-based comparison of at least two vehicle components of the tracked vehicle, at least one of which is a component of the track belt.

The approach according to the invention is based on the fundamental consideration that a tracked vehicle comprises not only the track belt components, in particular, the outer lugs, which wear to a comparatively great extent over the duration of use, but also components having comparatively less wear or no wear at all, for example, the rollers or other components of the crawler track assembly or of the tracked vehicle. The track belt itself also consists of different components which are necessarily subject to a different wear. For example, the height and/or width of the outer lugs changes to a comparatively great extent over the duration of use. The thickness and/or width of the crawler belt, however, does not change during this time period, or at least not to a significant extent.

With the aid of an image-based method, it is now possible, for example, on the basis of a close-up view of a vehicle area which encompasses the track belt or at least the outer lugs, to form a ratio of the height and/or the width of the outer lugs with respect to an extension of the components wearing to a lesser extent or not at all ("reference geometry"), in particular with respect to the thickness and/or width of the crawler belt and, on the basis thereof, to ascertain the state of wear and, in particular, on the basis of an electronically stored wear model, to ascertain the remaining service life of the track belt.

In particular, the evaluation device provided according to the invention can compare the result of the comparison of two radial extensions (the height of the outer lugs, on the one hand, and the thickness of the crawler belt, on the other hand) or two width extensions (the width of the outer lugs in or transversely to the direction of travel, on the one hand, and the width of the crawler belt, on the other hand) with setpoint values stored in a database ("wear model") and, on the basis thereof, ascertain the present state of wear. It is also conceivable that the evaluation device displays, to the user, additionally or alternatively, the ascertained ratio of measured values, i.e., for example, the ratio of the height or the width of the outer lugs with respect to the thickness or the width of the crawler belt, and/or the absolute height or width of the outer lugs ascertained on the basis of the ratio of measured values, in particular, as a numerical value. If the determination of the state of wear according to the invention ("measurement") is carried out multiple times over the duration of use of the track belt and the particular comparison results are stored, the wear model can be automatically further adapted on the basis of the measurements. The remaining service life of the track belt can then be particularly precisely ascertained, since an individual wear behavior can also be taken into account in this case.

Specifically, an evaluation device is provided, which is configured for carrying out a determination of the state of wear of at least one track belt of the crawler track assembly with the aid of an image-based comparison of at least two vehicle components, at least one of which is a component of the track belt. Such a determination of the state of wear takes place, in particular, in an automated manner, as soon as a mobile camera of the user or a camera fixedly mounted on the vehicle records an image of the track belt, for example, a lateral close-up or a close-up view from above.

According to the preferred embodiment, the evaluation device is configured for carrying out a determination of the state of wear of at least one track belt of the crawler track assembly with the aid of an image-based comparison of at least two components of the track belt.

According to the particularly preferred embodiment, the track belt is a moving belt which comprises, as components, a crawler belt and outer lugs situated on the outside of the crawler belt. Such a track belt can also comprise guide blocks or teeth which are situated on the inside of the crawler belt and, in principle, also form a component which can be taken into account in the image-based comparison. For the sake of completeness, it is pointed out that the state of wear of a track chain and, in particular, of the track pads, can also be determined in the manner according to the invention.

In another embodiment, the thickness of the crawler belt is compared to the height of at least one of the outer lugs. As previously indicated, other components of the vehicle or of the particular track belt can also be compared with one another, in principle. It is particularly preferred when the components which are compared to the outer lugs are the crawler belt and/or the guide blocks, however, since their dimensions can be easily determined and these components have no wear or at least no significant wear with respect to their extension in the radial direction, in the direction of travel, and/or transversely to the direction of travel.

According to another embodiment, the evaluation device is configured for carrying out the image-based comparison based on an image, for example, a photograph from the side, which is recorded by a camera and depicts at least two of the components to be compared. The camera is, in particular, a component of the evaluation device in this case.

According to the particularly preferred embodiment, the evaluation device is a mobile evaluation device, i.e., an evaluation device which is not necessarily fixedly connected to the tracked vehicle. A mobile evaluation device is, in particular, a smartphone, a tablet computer, a notebook, or the like. One essential advantage in this case is that such an evaluation device can be carried along by any user, which is common anyway nowadays, in particular, in the case of a smartphone, whereby the evaluation device can also be utilized for different tracked vehicles, in particular, agricultural tracked vehicles. In principle, the evaluation device can also be a component of a vehicle-specific driver assistance system and, therefore, not mobile, wherein the camera is mobile in this case, however.

According to another embodiment, the evaluation device can display the recorded image, for example, the close-up view from the side. Additionally or alternatively, the evaluation device can also display pieces of driver information graphically and/or with the aid of augmented reality. The latter makes it possible to visually record the particular track belt, for example, with the aid of the camera of an evaluation device which is fixedly installed on the vehicle or, in particular, with the aid of a mobile evaluation device, wherein, simultaneously, the state of wear and/or graphical auxiliary means, for example, virtual auxiliary lines, is/are displayed, via the principle of augmented reality, for determining the state of wear. The state of wear can also be represented, for example, by a coloring of the represented outer lugs.

According to the further preferred embodiment, parallel virtual lines, in particular, are inserted into the image as pieces of driver information, wherein a first line extends along the underside of the crawler belt, a second line extends along the top side of the crawler belt, and a third line extends along the top side of one or several of the outer lugs. The evaluation device can utilize these lines as auxiliary lines in order to thereby determine the ratio of belt thickness to lug height, on the basis of which the state of wear and, in particular, the actual lug height can be ascertained.

There are different possibilities of the image-based comparison of the at least two components of the track belt. The comparison can take place, in a pixel-based manner, i.e., by calculating the ratio of the number of pixels, and so it is not necessary to maintain a precise distance between the camera and the track belt.

Alternatively, track belt-specific data can be entered and/or received via the evaluation device; the track belt-specific data include the original and/or present thickness and/or width of the crawler belt or can be utilized for ascertaining the thickness and/or width. For example, it is conceivable that the user enters the track belt type via the, in particular, mobile, evaluation device, for example, the smartphone, which makes it possible for the evaluation device to ascertain the original thickness and/or width of the crawler belt via an appropriate database. It is also conceivable that the user enters individual original dimensions of the track belt, for example, the original lug height and/or width, and/or the overall thickness of the crawler belt and outer lugs, into the evaluation device. With the aid of the absolute value for the thickness and/or width of the crawler belt, which has been entered or has been ascertained in this way, the evaluation device can then computationally ascertain the absolute value for the lug height and/or width based on the image-based comparison result.

Various further pieces of driver information can be displayed, for example, at least one graphical representation of a radial cross-section of the particular track belt, wherein this representation includes at least one outer lug and one assigned portion of the crawler belt. In addition, the virtual lines can be displayed, as driver information, not only in the image, but also within the graphical representation of the radial cross-section, as an additional orientation for the user. The ascertained height and/or width of the outer lugs can also be displayed, in particular, as an absolute value, as one further piece of driver information. Moreover, it is conceivable to display the state of wear, the remaining service life, and/or the date of the first application, and/or the road-travel portion for the particular track belt. In principle, it is also conceivable in this case to simultaneously display individual or several pieces of this driver information for two track belts positioned opposite one another relative to the vehicle longitudinal axis, which allows for a simple comparison of the particular states of wear of the two track belts.

The particular ascertained distance between the top side of the crawler belt and the top side of the outer lug or lugs and/or the particular ascertained distance between the second and the third auxiliary lines and/or the ascertained state of wear and/or the ascertained height of the outer lugs can be stored in a memory. In particular, these data can be gathered in the memory, whereby the evaluation device can particularly precisely ascertain the service life.

The present invention also relates to a method for determining the state of wear and/or the service life of at least one track belt of a tracked vehicle, wherein at least one track-laying unit of a crawler track assembly of the vehicle comprises at least two ground drive wheels and a track belt guided over the ground drive wheels. According to the invention, an evaluation device carries out a determination of the state of wear of at least one of the track belts with the aid of an image-based comparison of at least two vehicle components of the tracked vehicle, at least one of which is a component of the track belt.

BRIEF DESCRIPTION OF THE DRAWINGS

The invention is explained in the following in greater detail with reference to a drawing representing only one exemplary embodiment. In the drawings.

DETAILED DESCRIPTION OF THE EMBODIMENTS

Figure 1:
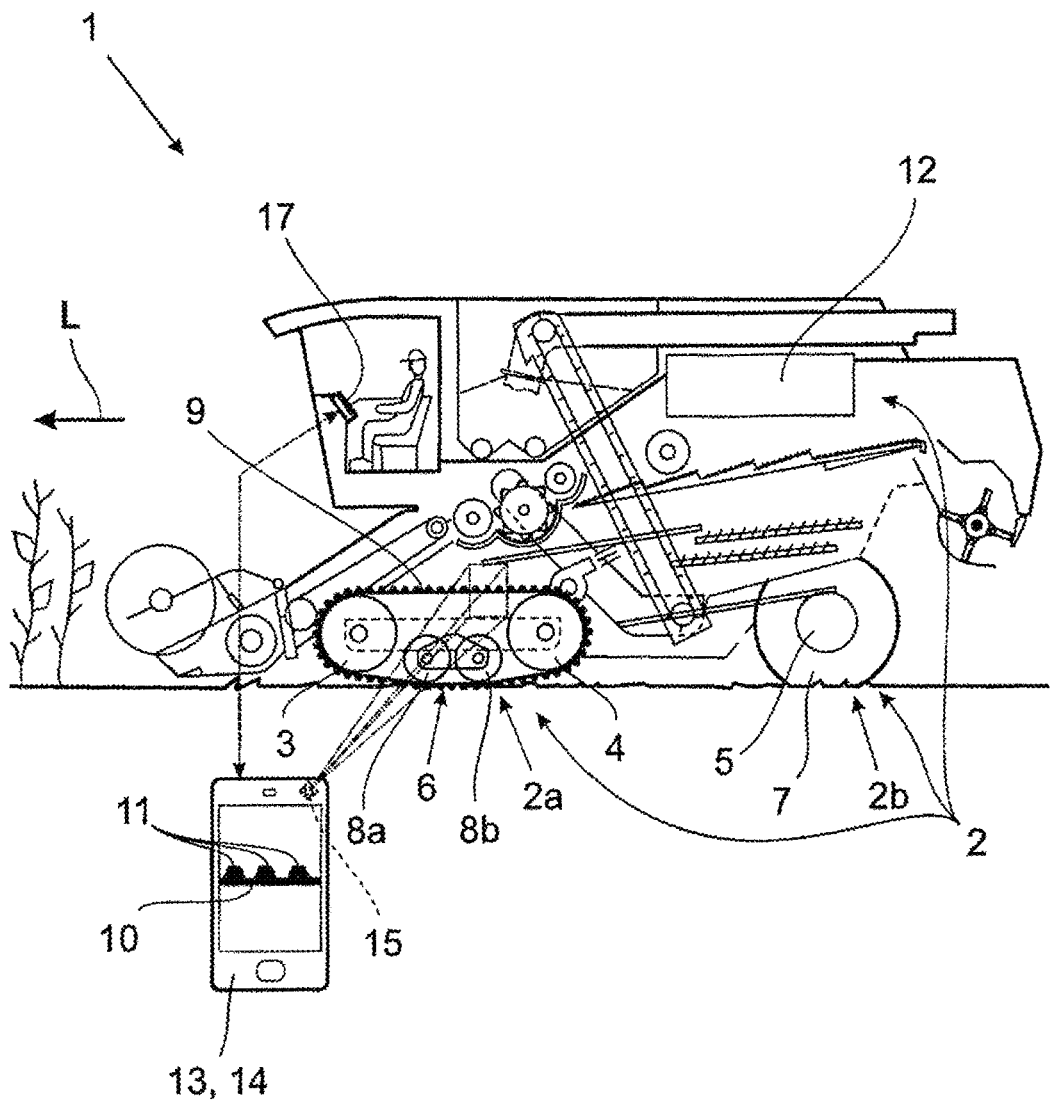
FIG. 1 shows a tracked vehicle according to the invention in the form of an agricultural vehicle comprising a half-track crawler assembly and a mobile evaluation device.

The tracked vehicle according to the invention, which is designed as an agricultural tracked vehicle 1 in this case, by way of example, can be designed in highly different ways. For example, the agricultural vehicle 1 can be a self-propelled harvesting machine, such as a combine harvester or a forage harvester, a tractor, or also a trailer. The benefits of the approach according to the invention are particularly clear in tracked vehicles or half-track vehicles comprising a crawler track assembly. In the exemplary embodiment which is represented and, in this respect, is preferred, the agricultural vehicle 1 is a combine harvester comprising a half-track crawler assembly, as will be explained further below.

The ground drive 2 of the agricultural vehicle 1 described here by way of example comprises, in this case and preferably, at least two ground drive wheels 3 to 5, which are positioned opposite one another relative to the vehicle longitudinal axis or the direction of travel L. In the view in FIG. 1, only the left ground drive wheels 3 to 5 are apparent. Relative to the vehicle longitudinal axis or the direction of travel L, corresponding ground drive wheels 3 to 5 are positioned opposite these ground drive wheels 3 to 5. In this case, the ground drive wheels 3, 4 are components of a crawler track assembly 2a and the ground drive wheels 5 are components of a wheeled travel mechanism 2b. Correspondingly, the ground drive wheels 3, 4 run in assigned track-laying units 6, whereas the ground drive wheels 5 roll via tires 7 on the ground. The term "ground drive wheel" is therefore to be broadly understood in the present case. It encompasses wheels which are assigned to a crawler track assembly 2a and run in corresponding track-laying units 6, as well as wheels which are assigned to a wheeled travel mechanism 2b and are each provided with a tire 7. It is to be noted that, although multiple track-laying units 6 are under discussion here, it is also generally conceivable to provide only one single track-laying unit 6.

The crawler track assembly 2a comprises, in this case, two track-laying units 6 which are positioned opposite each other relative to the vehicle longitudinal axis or the direction of travel L and each comprise, in this case and preferably, a front ground drive wheel 3 as the guide wheel or guide roller, a rear ground drive wheel 4 as the drive wheel or drive roller, and, in this case and preferably, two land wheels or land rollers 8a, 8b located therebetween. The track-laying units 6 also each comprise a track belt 9 which connects the ground drive wheels 3, 4 and land wheels or land rollers 8a, 8b. The land wheels or land rollers 8a, 8b hold the lower segment of the particular track belt 9 in continuous contact with the ground, and so a uniform weight distribution over the entire contact area between the ground and the particular track belt 9 results. The track belt 9 is designed as a rubber track in this case, which comprises a crawler belt 10 made of several layers of woven fabric and steel, which are extrusion-coated with rubber, as well as outer lugs 11 radially on the outside and guide blocks (not represented) radially on the inside. The approach according to the invention can also be applied, in principle, to a track or track chain comprising several steel contact face sections which are provided with rubber pads which are located on the outside and correspond to the outer lugs. In principle, other types of track-laying units are also conceivable, which have, for example, a triangular shape including two guide rollers which establish the continuous ground contact, and a drive roller situated above these, in the center (triangular traction unit).

Moreover, a ground drive 12 for generating a propulsion of the agricultural vehicle 1 is provided here and preferably, which is not absolutely necessary in the approach according to the invention, however, for example, in the case of a non-driven trailer. In the exemplary embodiment represented here, the ground drive wheels 4 can be driven by the ground drive 12 in any case. In principle, it is also conceivable, additionally or alternatively, that the ground drive wheels 3 of the crawler track assembly 2a or all ground drive wheels 3 to 5 of the agricultural vehicle 1, overall, can be driven by the ground drive 12.

It is essential that an evaluation device 13 is provided, which is configured for carrying out a determination of the state of wear of at least one of the track belts 9 with the aid of an image-based comparison of at least two components 10, 11 of the vehicle 1, at least one of which is a component 10, 11 of the track belt 9. For example, in the case of the track belt 9, one of the components 10, 11, namely the crawler belt 10, is subject to considerably less wear than the other component, namely the outer lugs 11. In this case and preferably, the crawler belt 10 is not even exposed to any significant wear at all. In this case, "wear" is intended to mean a wear-induced reduction of the dimensions of the particular components 10, 11, i.e., a wear-induced reduction of the thickness and/or width of the crawler belt 10 and a wear-induced reduction of the height of the outer lugs 11. In the case of outer lugs 11 tapering toward the outside of the belt, as the height of the outer lugs 11 decreases, their width can also increase, due to wear.

According to the invention, it is therefore provided that a wear of a component 11 of the track belt 9 is ascertained, in particular, in an automated way, by way of an image-based comparison of this component 11 with one further component 10 of the tracked vehicle or, in this case and preferably, of the track belt 9, which is subject to no wear or substantially less wear. The latter is therefore utilized as reference geometry for the comparison.

In this way, the decreasing extension, for example, the radial extension, of the comparatively intensely wearing component 11, namely the outer lugs 11 in this case, can be compared with the reference geometry, for example, the radial extension of the component 10 wearing hardly at all or not at all, namely the crawler belt 10 in this case. Provided the original relationship between a wearing component and the reference geometry, namely between the lug height and the belt thickness in this case, is known, the state of wear or extent of wear can be ascertained in this way. The state of wear can also be determined on the basis of a sequence of several such image-based comparisons over the duration of use of the particular track belt 9. Provided an absolute value of the reference geometry is known, namely, i.e., one of the track belt dimensions, for example, the present height or the original height of the crawler belt 10, the evaluation device 13 can also computationally determine—on the basis of the ascertained ratio between the wearing component and the reference geometry, namely between the crawler belt thickness and the lug height in this case—and, optionally, display a present absolute value for the extension of the wearing component, namely the lug height or width in this case.

In this case and preferably, the evaluation device 13 allows for the calculation—also on the basis of the ascertained extension of the wearing component, namely the lug height or width in this case—of a remaining service life of the particular track belt 9, in particular on the basis of a wear model which can be stored in the evaluation device 13 or which can be accessed by the evaluation device 13. In such a wear model, an appropriate value for the remaining service life is assigned, for example, to different lug heights and/or widths, depending on the type of track belt utilized.

It is to be emphasized once again that, in the exemplary embodiment described here, the state of wear of the outer lugs 11 is determined by the comparison of the outer lugs 11 with the crawler belt 10. In principle, it would also be conceivable, however, to compare the outer lugs 11 with other components of the tracked vehicle 1 or the track belt 9, for example, the inner guide blocks (not represented here) of the particular track belt 9, since other components, such as the guide blocks, are also not subject to substantial wear in the course of the duration of use which affects their dimensions serving as reference geometry, for example, radial dimensions or their height.

In the case of the agricultural tracked vehicle 1 represented in FIG. 1, a smartphone 14 is provided as the evaluation device 13. Alternatively, a tablet computer, notebook, or the like, can also be utilized as the evaluation device 13. In principle, the evaluation device 13 does not need to be a mobile evaluation device, however. Instead, the evaluation device 13 can also be fixedly installed in or on the vehicle 1, in particular, as a component of a driver assistance system 17, or at another point, for example, on the agricultural farm. It merely needs to be ensured that an image of the track belt 9 or a portion thereof is available to the evaluation device 13, with the aid of which the evaluation device 13 can carry out the comparison, according to the invention, of the at least two components 10, 11.

Preferably, a camera 15 is provided, which makes it possible to record an image of the track belt 9, for example, in the form of a lateral close-up or a photograph from above, which shows the at least two components to be compared. In the exemplary embodiment in FIG. 1, the camera 15 is a component of the smartphone 14 and, therefore, a component of the evaluation device 13 which is mobile in this case. In principle, the camera 15 can also be fixedly installed on the vehicle 1. As represented in FIG. 1, with the aid of the camera 15, in a simple way, an area on the vehicle 1 comprising the track belt 9 can be detected and an image can be generated, in which the two components 10, 11 are apparent along their entire extension, for example, the radial extension in this case, which is decisive for the comparison.

Figure 2:
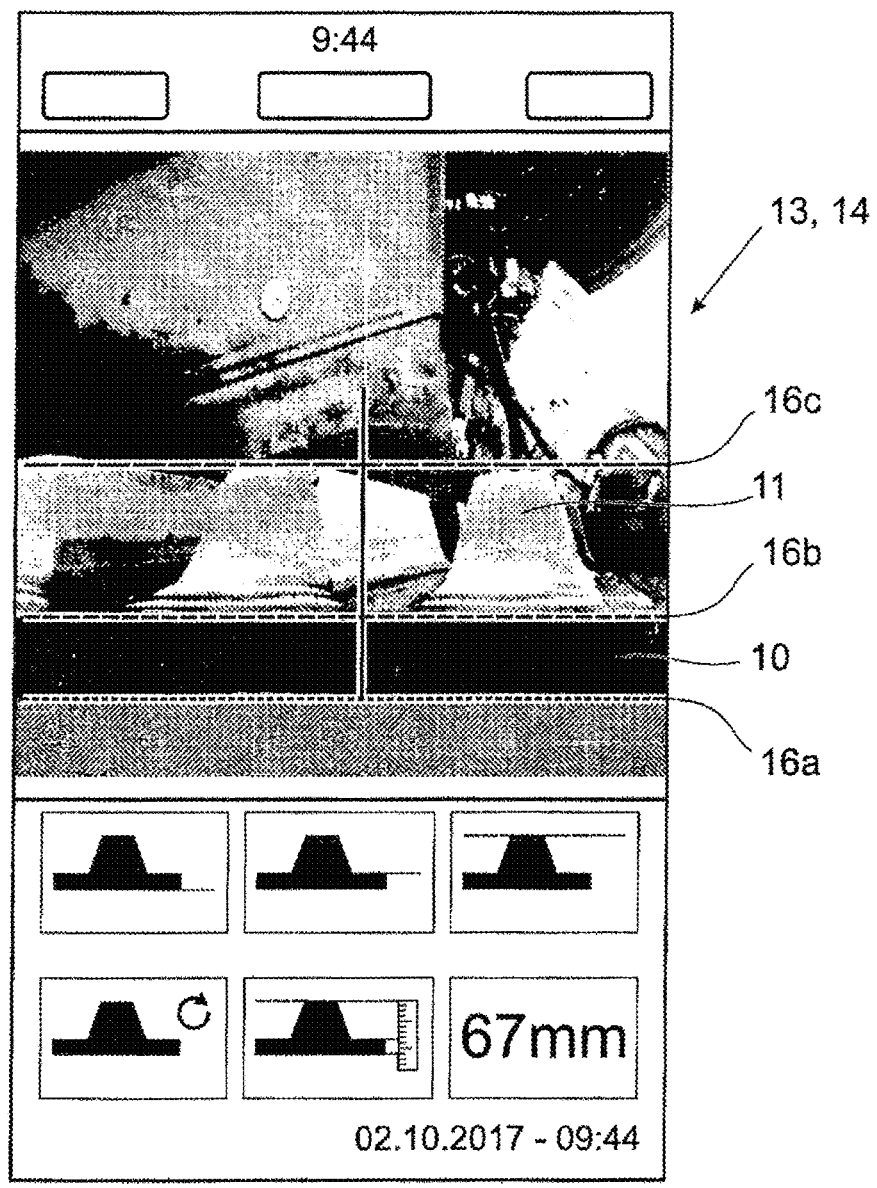
FIG. 2 shows a representation of pieces of driver information according to a first exemplary embodiment at a first point in time.
Figure 3:
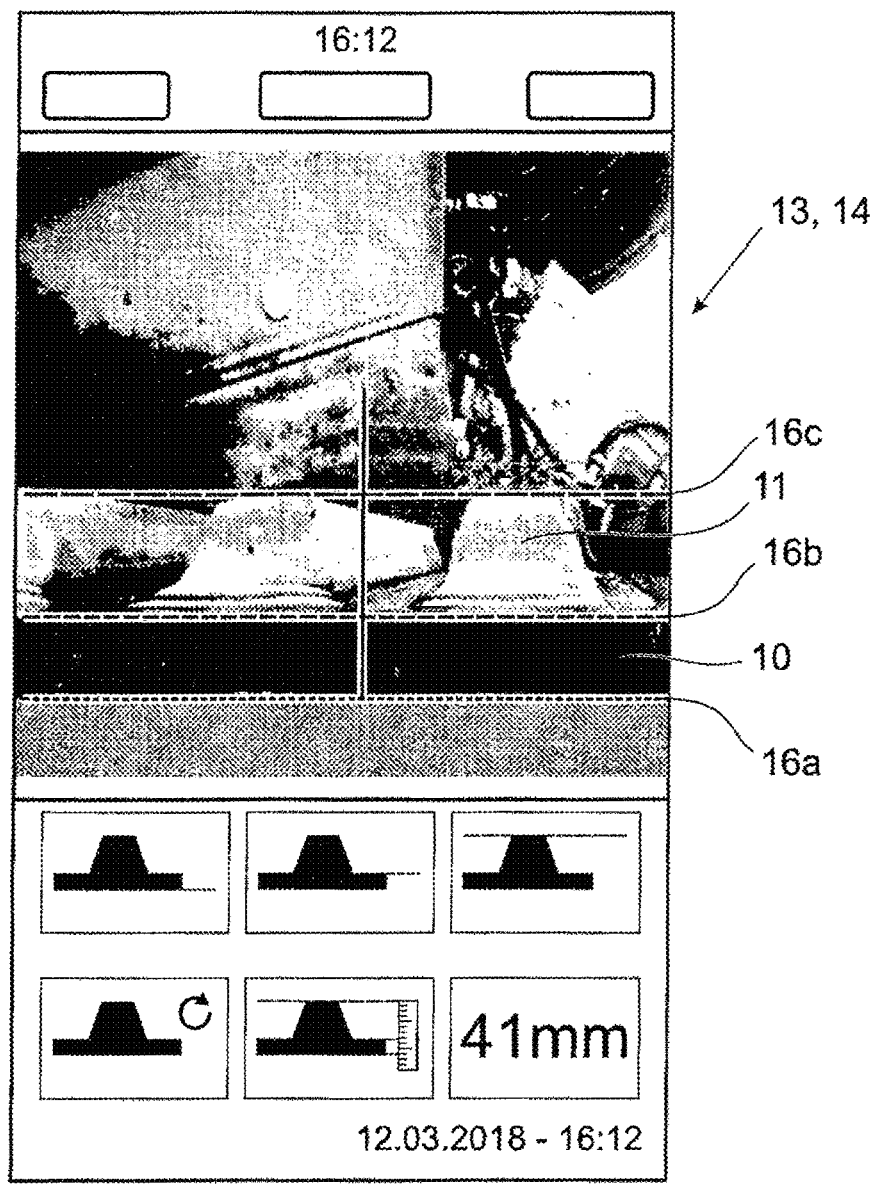
FIG. 3 shows a representation of pieces of driver information according to the first exemplary embodiment at a later point in time.
Figure 4:
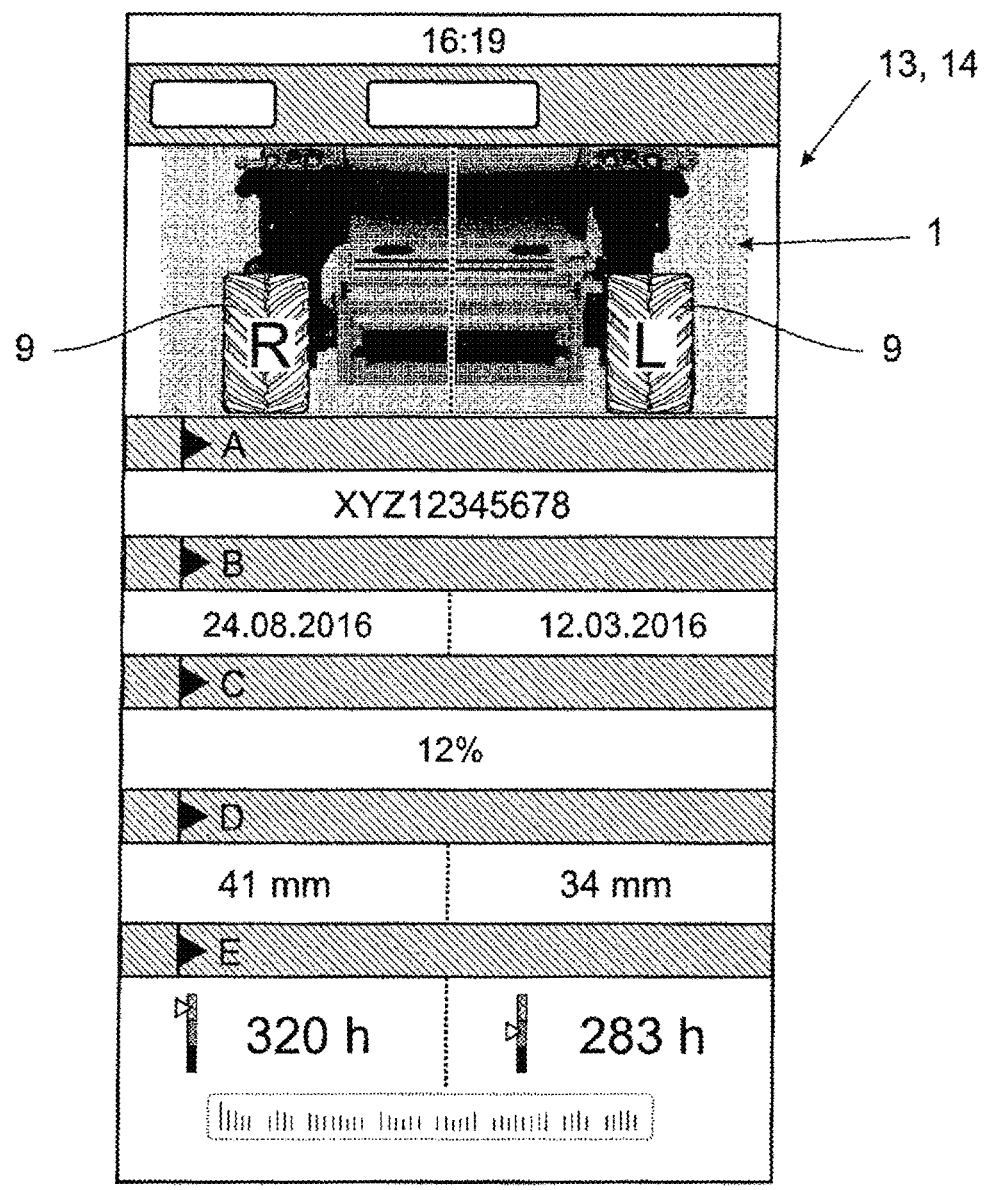
FIG. 4 shows a representation of pieces of driver information according to a second exemplary embodiment.

As FIGS. 2 to 4 show, the evaluation device 13 can comprise a computer program or an appropriate mobile app for determining the state of wear and/or the service life, with the aid of which the recorded image can be displayed. In this case and preferably, different pieces of driver information can also be represented thereon, graphically and/or with the aid of augmented reality, on the evaluation device 13.

In FIGS. 2 and 3 it is apparent, for example, that several parallel virtual lines 16a, 16b, 16c can be inserted into the image, as pieces of driver information. This takes place, in particular, with the aid of augmented reality, i.e., the virtual lines 16a, 16b, 16c are inserted into the camera image, in particular, the "live" image, in real time. A first line 16a extends, in this case and preferably, along the underside—which is represented in the image—of the crawler belt 10 of the particular track belt 9. A second line 16b extends along the represented top side of the crawler belt 10. Finally, a third line 16c extends along the top side of one or several outer lugs 11 represented in the image. On the basis of the lines 16a, 16b, 16c or the particular distances therebetween, not only can the user recognize, at first glance, the relationship between the crawler belt thickness and the height of the outer lugs, but the evaluation device 13 can also highly precisely calculate, on the basis thereof, the aforementioned ratio and, on the basis thereof, ascertain the state of wear. In a comparison of FIGS. 2 and 3, it is readily apparent that the ratio of the crawler belt thickness and the height of the outer lugs has increased in the course of the duration of use. The ratio at the point in time selected in FIG. 2 was still approximately $1/3$, whereas the ratio at the point in time selected in FIG. 3 was approximately $1/2$.

It is to be emphasized that the evaluation device 13 can carry out the image-based comparisons, in principle, also without the presence of the aforementioned virtual lines 16a, 16b, 16c. The virtual lines also have the advantage, however, that the evaluation device 13 can ascertain the distances between the lines 16a, 16b, 16c in a pixel-based manner and/or compare the particular distances with one another in a pixel-based manner.

In this way, it is not necessary to maintain a certain distance between the camera 15 and the track belt 9 and/or a certain angle with respect to the track belt 9 during the generation of the image.

As FIGS. 2 and 3 also show, the evaluation device 13 is also configured, in this case and preferably, for ascertaining, on the basis of the comparison of the distance between the lines 16a and 16b, which corresponds to the thickness of the crawler belt 10, and the distance between the lines 16b and 16c, which corresponds to the height of the outer lugs 11, the height of the outer lugs 11 as an absolute value. In this case, the height of the outer lugs 11 is 67 mm at the point in time at which the photograph in FIG. 2 is based, and is 41 mm at the point in time at which the photograph in FIG. 3 is based. For the purpose of determining the absolute value, the evaluation device 13 also allows, in this case and preferably, for the input, by the user, and/or the receipt of track belt-specific data which include the original and/or the present thickness of the crawler belt 10 or allows for an ascertainment of this thickness by way of the evaluation device 13. For example, it is conceivable to enter the track belt type of the particular track belt 9 into the evaluation device 13. It is also conceivable to enter the precise dimensions of the crawler belt thickness and/or the lug height, in particular, after a manual measurement has been carried out, or to transmit corresponding data to the evaluation device 13.

The aforementioned image of the track belt 9, which has been recorded by the camera 15 which is mobile in this case, has the aforementioned virtual lines superimposed thereon with the aid of augmented reality, in particular, in real time. The determination of the state of wear based on the ratio of the crawler belt thickness with respect to the height of the outer lugs can therefore also take place in real time. The state of wear can then also be visualized, for example, with the aid of augmented reality, by way of a coloring of the outer lugs 11 which are apparent in the recorded image.

In addition to the image of the track belt 9 shown, the evaluation device 13 can also display further pieces of driver information. In the representations of the smartphone 14 shown in FIGS. 2 and 3, three graphical representations of a radial cross-section of the track belt 9 are represented in the upper row of the lower screen portion, including one of the virtual lines in each case. On the basis thereof, the user receives the information regarding which of the virtual lines inserted in the image corresponds to the lower side of the crawler belt 10, which of the lines corresponds to the top side of the crawler belt 10, and which of the lines corresponds to the top side of the outer lugs 11. In the bottom row, furthermore, a reset button (left button) and a button for starting the comparison process (center button) are provided, as virtual control elements. The absolute lug height is then displayed to the right thereof.

FIG. 4 shows another screen view of the smartphone 14, in which the agricultural vehicle 1 is represented, in an upper screen portion, from the front and, specifically, in this case and preferably, without a front attachment, and so the track belts 9 positioned opposite one another relative to the vehicle longitudinal axis are apparent. Therebelow, the driver finds, for example, as further pieces of driver information, the vehicle number (marked with "A"), the particular date of the first application for each of the two track belts 9 (marked with "B"), the road-travel portion ascertained via GPS (marked with "C"), the ascertained absolute value for the lug height for each of the two track belts 9 (marked with "D"), and the remaining service life and the state of wear for each of the two track belts 9 (marked with "E"). In addition, further pieces of driver information, for example, text-based information, can be represented, as represented on the lower edge of the screen in this case.

The distances between the top side of the crawler belt 10 and the top side of the outer lug or lugs 11 ascertained according to the approach according to the invention, or the ascertained distances between the second line 16b and the third line 16c and/or the ascertained states of wear and/or the ascertained values for the height of the outer lugs 11 are all stored and, in particular, gathered, in a memory (not represented), in this case and preferably. The memory can be a component of the evaluation device 13 or of a driver assistance system 17 of the agricultural vehicle 1. It can also be an external memory, for example, a farm-based computer. In particular, the memory is a memory of a working collective, which also contains corresponding data from other agricultural vehicles.

The comparison of the present lug height and/or width with a lug height or width predicted on the basis of previous calculations can also be utilized for adjusting the wear model via individual correction factors, whereby the remaining service life can be more precisely ascertained. This takes place automatically, in particular. This is, in particular, a self-learning system with the aid of a central neural network as well as a database.

LIST OF REFERENCE CHARACTERS 1 tracked vehicle
2 ground drive
2a crawler track assembly
2b wheeled travel mechanism
3-5 ground drive wheels
6 track-laying units
7 tire
8a, 8b land wheels
9 track belt
10 crawler belt
11 outer lugs
12 ground drive
13 evaluation device
14 smartphone
15 camera
16a-16c auxiliary lines
17 driver assistance system
L direction of travel

What is claimed is:
1. A tracked vehicle comprising:
a crawler track assembly including at least one track-laying unit, said at least one track-laying unit comprising at least two ground drive wheels and a track belt guided over the ground drive wheels, and
an evaluation device configured for carrying out a determination of a state of wear the track belt of the at least one track-laying unit with the aid of an image-based comparison of at least two vehicle components of the track belt,
wherein the track belt is a moving belt and the at least two components of the track belt comprise a crawler belt and outer lugs situated on an outside of the crawler belt, and
wherein the evaluation device is configured to insert virtual lines into a displayed image of the vehicle components as pieces of driver information, wherein a first line extends along an underside of the crawler belt represented in the image, a second line extends along a represented top side of the crawler belt, and a third line extends along a top side of at least one of the outer lugs represented in the image.

2. The tracked vehicle as claimed in claim 1, wherein the tracked vehicle is configured such that one of the at least two components is subject to less wear relative to an extension in the radial direction, in and/or transversely to a direction of travel than the other component, and/or no wear relative to its extension in the radial direction, in and/or transversely to the direction of travel.

3. The tracked vehicle as claimed in claim 1, wherein the evaluation device is configured for comparing, in the image-based comparison, a thickness and/or width of the crawler belt with a height and/or width of at least one of the outer lugs.

4. The tracked vehicle as claimed in claim 1, wherein the evaluation device is configured for carrying out the image-based comparison based on an image recorded by a camera, which depicts the at least two vehicle components to be compared.

5. The tracked vehicle as claimed in claim 1, wherein the evaluation device is selected from the group consisting of a mobile evaluation device, a smartphone, a tablet computer, and a notebook, and/or wherein the evaluation device comprises at least one of a keypad, a screen, or a touchscreen.

6. The tracked vehicle as claimed in claim 1, wherein the evaluation device is configured for displaying a recorded image and/or representing pieces of driver information graphically and/or with the aid of augmented reality.

7. The tracked vehicle as claimed in claim 1, wherein the evaluation device is configured for ascertaining a distance between an underside of the crawler belt and a top side of the crawler belt and a distance between the top side of the crawler belt and a top side of at least one of the outer lugs, and for comparing the ascertained distances with one another, and/or ascertaining the distance between the first line and the second line and the distance between the second line and the third line and comparing the ascertained distances with one another.

8. The tracked vehicle as claimed in claim 1, wherein the evaluation device is configured for ascertaining a height and/or width of the outer lugs of the track belt based on the comparison.

9. The tracked vehicle as claimed in claim 7, wherein the particular distance is ascertained in a pixel-based manner and/or the particular distances are compared with one another in a pixel-based manner.

10. The tracked vehicle as claimed in claim 1, wherein the evaluation device is configured such that track belt-specific data can be entered and/or received via the evaluation device, wherein the track belt-specific data include an original and/or present thickness and/or width of the crawler belt, or the track-belt specific data enables the evaluation device to ascertain the original and/or present thickness and/or width of the crawler belt.

11. The tracked vehicle as claimed in claim 1, wherein the evaluation device is configured for displaying at least one graphical representation of a radial cross-section of the track belt as a piece of driver information and shows at least one outer lug and an assigned portion of the crawler belt, and/or wherein the piece of driver information includes at least one of the virtual lines, and/or the ascertained height and/or width of the outer lugs, the state of wear, remaining service life, date of the first application, and/or road-travel portion.

12. The tracked vehicle as claimed in claim 7, wherein the evaluation device is configured for storing in a memory at least one of the following pieces of data: the ascertained distance between the top side of the crawler belt and the top side of the outer lug or lugs, the ascertained distance between the second line and the third line, an ascertained state of wear, and/or an ascertained height of the outer lugs.

13. A method for determining a state of wear and/or a service life of at least one track belt of a tracked vehicle, wherein at least one track-laying unit of a crawler track assembly of the vehicle comprises at least two ground drive wheels and a track belt guided over the ground drive wheels, comprising the following steps:
  carrying out with an evaluation device a determination of the state of wear of the at least one track belt with the aid of an image-based comparison of at least two vehicle components of the track belt,
  wherein the track belt is a moving belt and the at least two components of the track belt comprise a crawler belt and outer lugs situated on an outside of the crawler belt,
  wherein the evaluation device inserts virtual lines into a displayed image of the vehicle components as pieces of driver information, wherein a first line extends along an underside of the crawler belt represented in the image, a second line extends along a represented top side of the crawler belt, and a third line extends along a top side of at least one of the outer lugs represented in the image.

* * * * *